March 3, 1936.  R. JONES  2,032,701
ATTACHMENT FOR STANDARD LAWN MOWERS
Filed Jan. 26, 1933   6 Sheets-Sheet 1
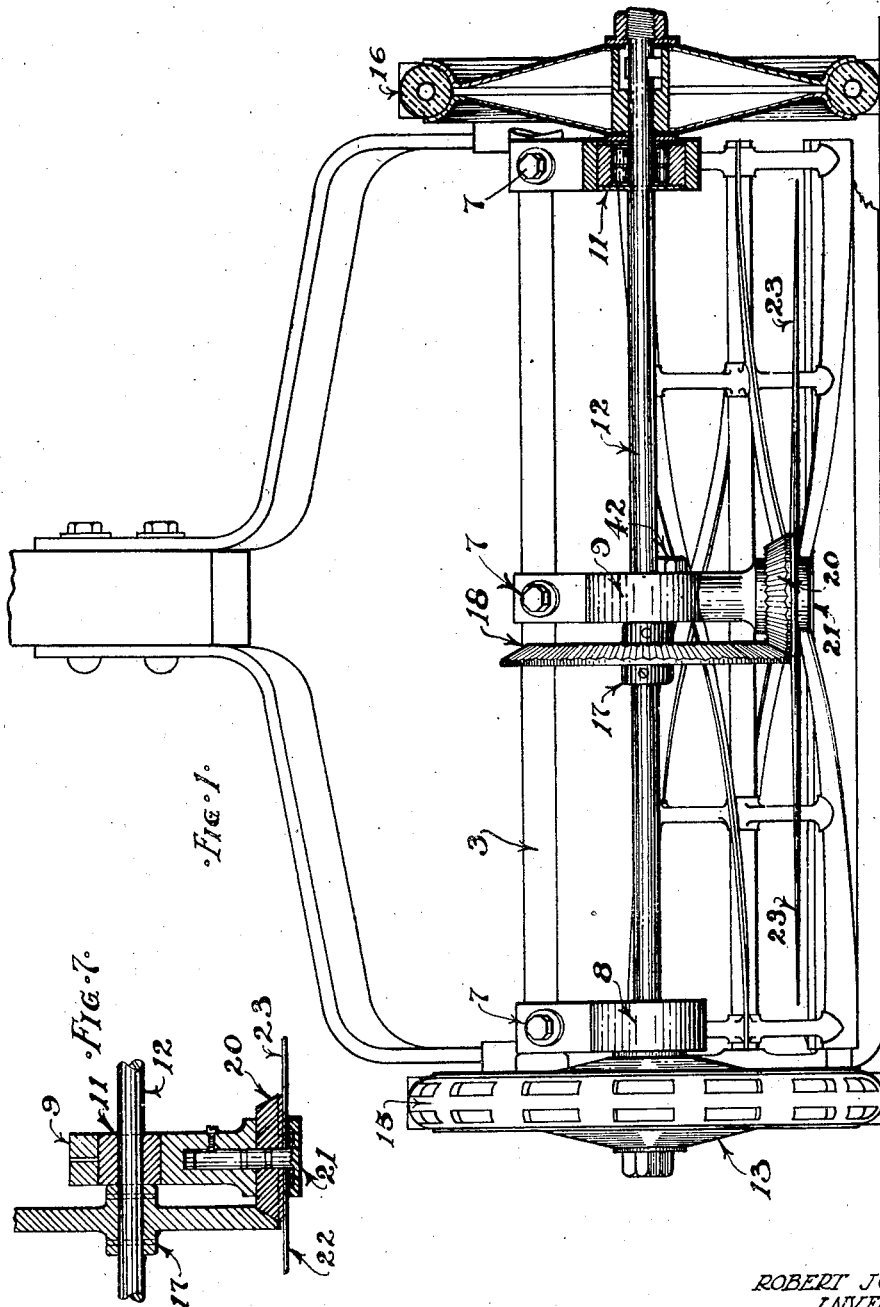
ROBERT JONES
INVENTOR
BY Harry Lew Dodson
ATTORNEYS

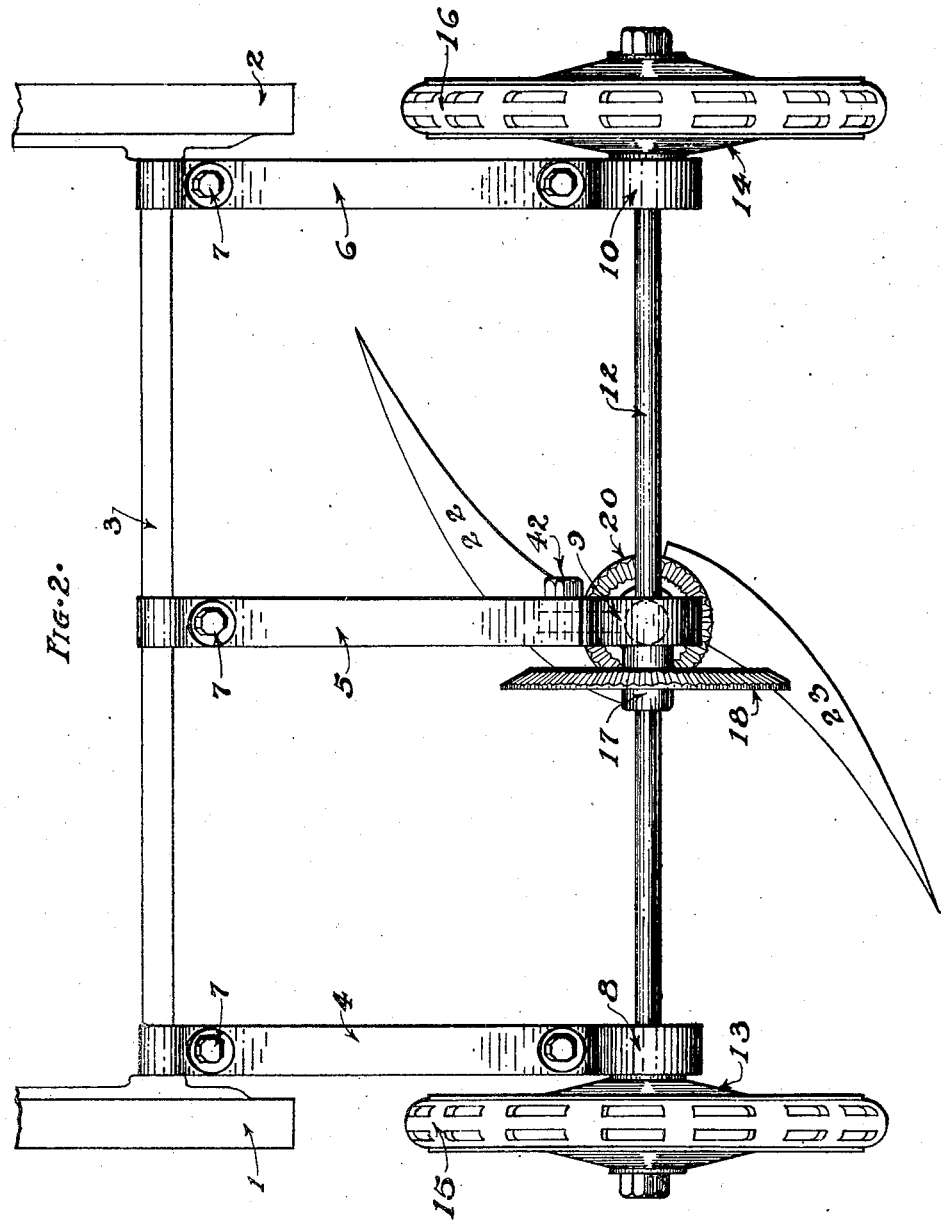

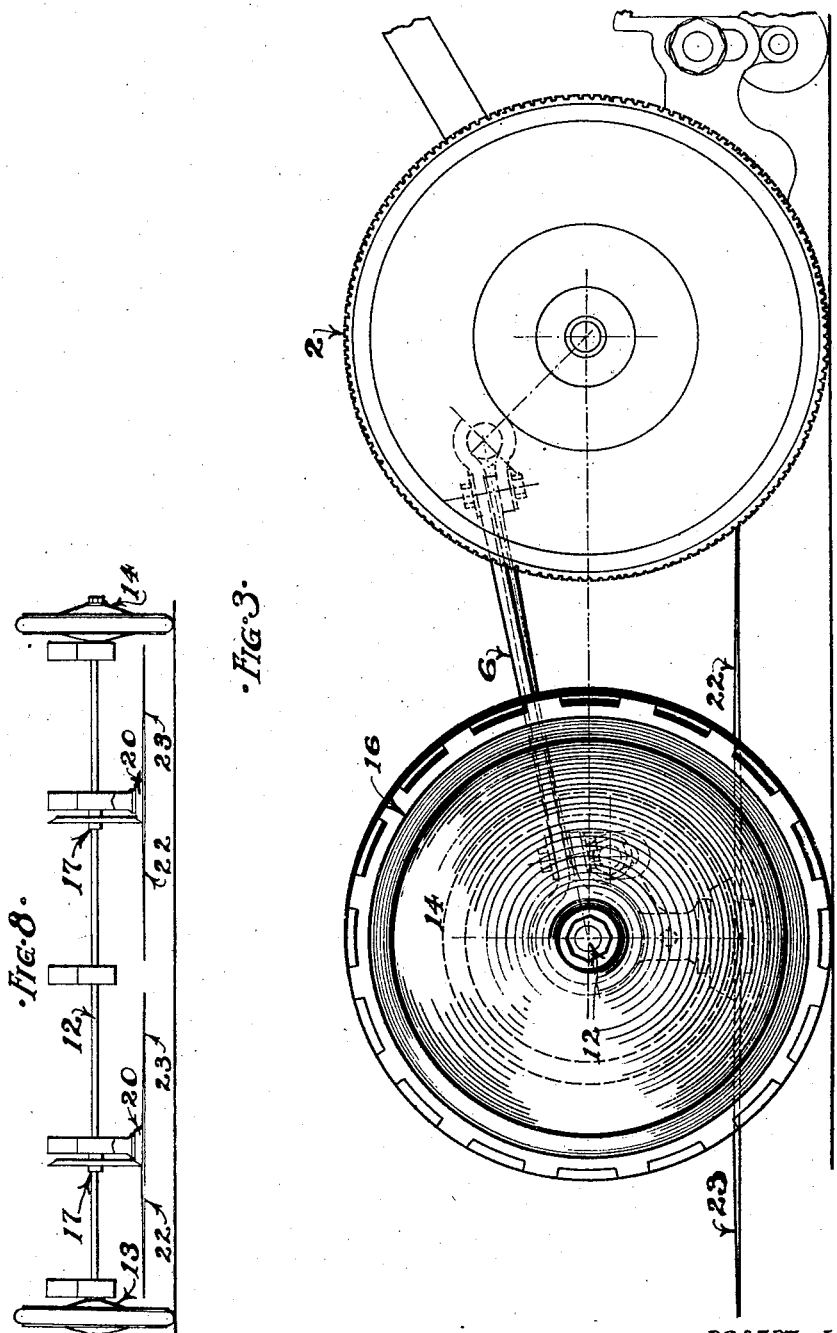

March 3, 1936.　　　　　　　R. JONES　　　　　　　2,032,701
ATTACHMENT FOR STANDARD LAWN MOWERS
Filed Jan. 26, 1933　　　　6 Sheets-Sheet 4
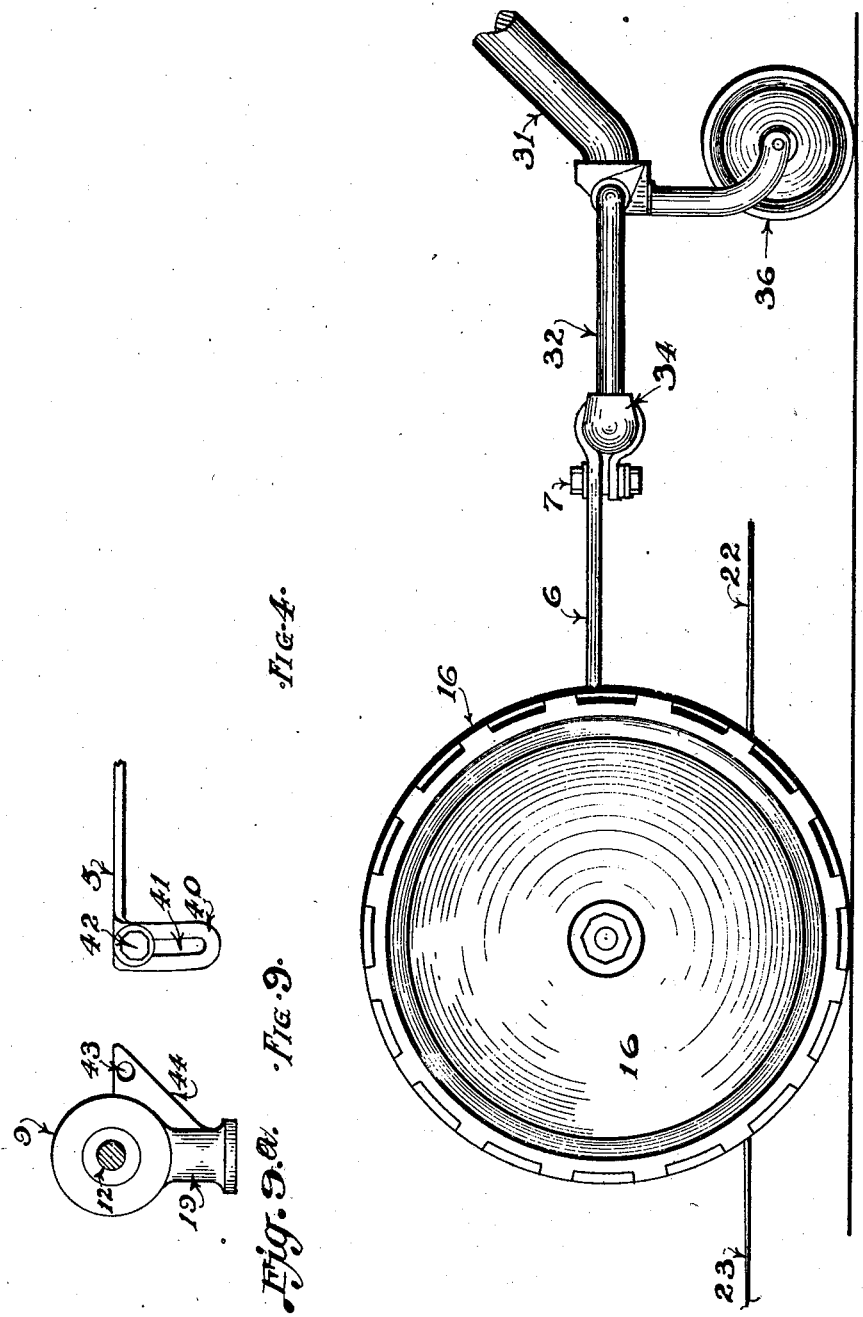
ROBERT JONES
INVENTOR
BY Harry Lea Dodson
ATTORNEYS March 3, 1936.  R. JONES  2,032,701
ATTACHMENT FOR STANDARD LAWN MOWERS
Filed Jan. 26, 1933  6 Sheets-Sheet 5
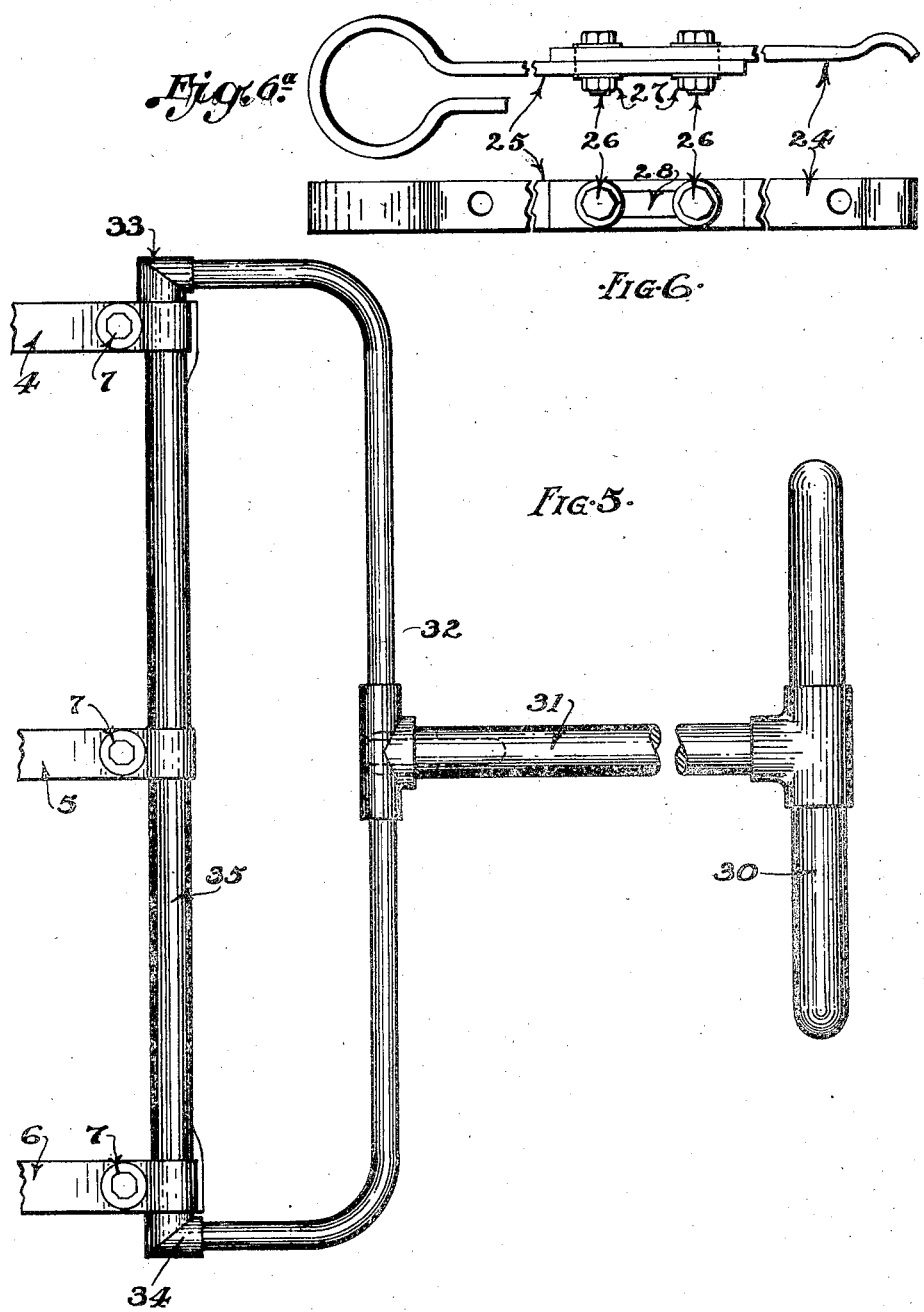

March 3, 1936.    R. JONES    2,032,701
ATTACHMENT FOR STANDARD LAWN MOWERS
Filed Jan. 26, 1933    6 Sheets-Sheet 6

INVENTOR
Robert Jones
BY
Harry Lea Dodson
ATTORNEY

Patented Mar. 3, 1936

2,032,701

UNITED STATES PATENT OFFICE 2,032,701

ATTACHMENT FOR STANDARD LAWN MOWERS

Robert Jones, Bay Shore, N. Y.

Application January 26, 1933, Serial No. 653,604

3 Claims. (Cl. 56—238)

My invention relates to that class of devices which are designed to provide improved means for cutting high or tough grasses. It is well known that there is nothing that will impart the velvety smoothness to a lawn as satisfactorily as the standard type of cutting blade but it is also well known that the rotary type of cutting blade will not operate in high grasses and will not cut dry stems successful.

My invention has for its principal object to provide an attachment which can be easily and quickly secured to any standard lawn mower, the attachment being provided with horizontal sickle shaped blades which are rotated in a horizontal plane. I have found in practice that by attaching my device to the standard lawn mower it will cut all types of high grass or grass with dried stems and will do so regardless of their height. By following the operation of my attachment with the standard type of lawn mower the smoothness, so desired in lawns, can be secured.

A further object of my invention is to provide detachable means which can be secured to the attachment when the lawn mower is not used and the attachment can then be employed for the purpose of cutting high grass.

A further object is to provide a construction which will permit the attachment to be moved to an inoperative position when it is desired to use the lawn mower without operating the attachment and to enable it to be so moved without the use of any tools.

By means of accomplishing the foregoing objects may be more readily understood by having reference to the accompanying drawings, which are hereunto annexed and are a part hereof, in which Fig. 1 is a front view of my improved attachments secured in a standard lawn mower, a portion being shown in section for the sake of clearness;

Fig. 2 is a top or plan view of my attachment, only a fragmentary portion of the lawn mower being shown;

Fig. 3 is a side elevation of my improved attachment secured to a standard lawn mower;

Fig. 4 is a side elevation of the attachment provided with the means for operating it as an individual unit;

Fig. 5 is a detail view of the handle to be attached when the attachment is to be used as shown in Fig. 4;

Fig. 6 is a fragmentary detail view showing in side elevation, means for varying the distance between the wheels of the attachment and the wheels of the lawn mower if it is desired to drive them by frictional contact with the wheels of the lawn mower instead of by traction with the ground. Fig. 6a is a side elevation of the same.

Fig. 7 is a fragmentary detail view of the driving mechanism for the horizontal blades; and Fig. 8 is a more or less diagrammatic view of my attachment showing a plurality of driving means.

Fig. 9 is a detail side view of the lug means to adjust the horizontal blades. Fig. 9a is a detail end view of the lug for attaching the same.

Similar reference numerals refer to similar parts throughout the entire description.

Figure 11:
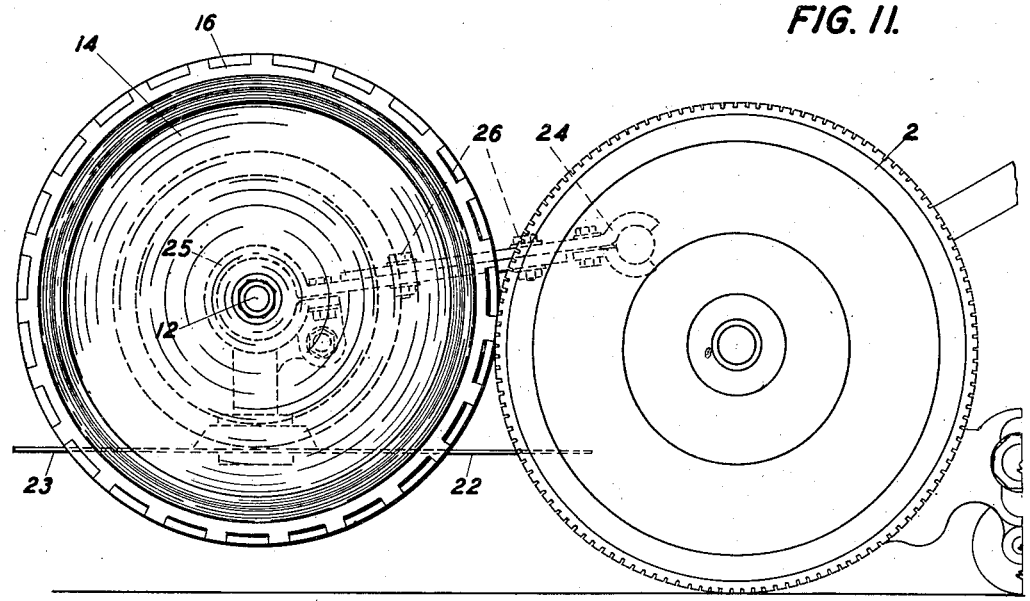
Fig. 11 shows a modified form of drive.
Figure 10:
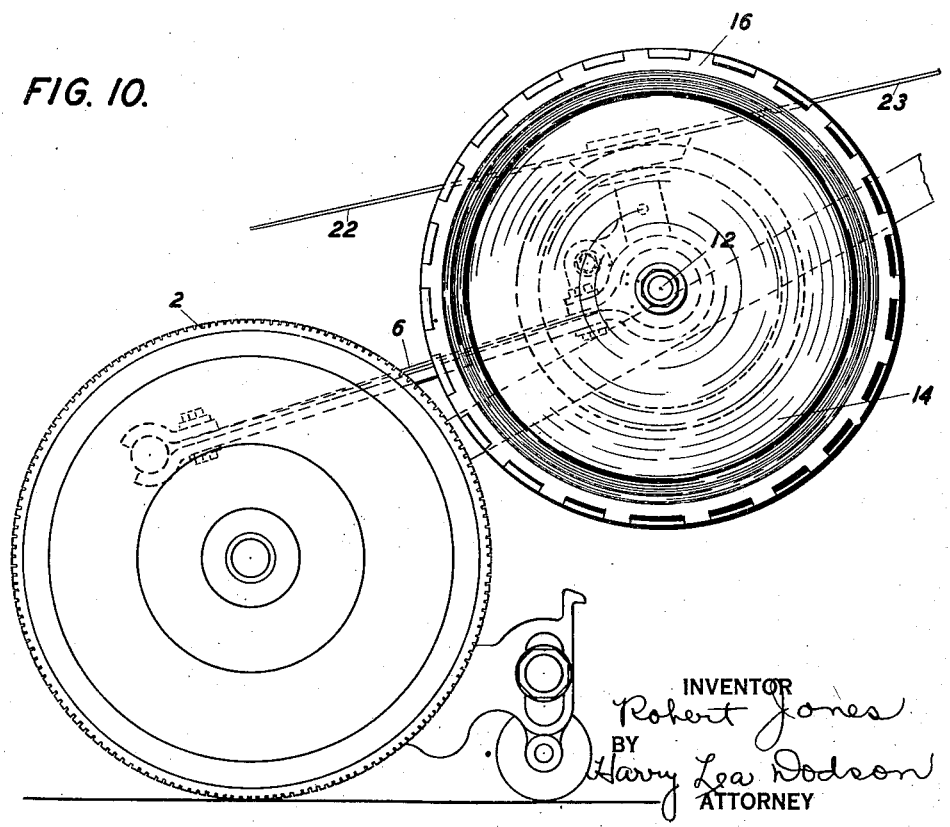
Fig. 10 shows the positioning of the attachment in inoperative position.

As shown in the drawings, the lawn mower is of standard construction which is so well known that description of its operating mechanism is unnecessary, except in so far as it pertains to the attachment. It is provided with wheels 1 and 2 and is equipped with a spacing bar 3.

My attachment consists of three clamping members, 4, 5 and 6 respectively. These members are detachably secured to the rod 3 by means of bolts 7, although obviously any type of securing means may be employed if desired. They are rotatably secured to the rod, so as to permit the attachment to be raised and lowered as necessitated by the unevenness of the ground. The forward ends 8, 9 and 10 of the clamping members 4, 5 and 6, are preferably equipped with anti-friction bearings 11, one of which is clearly shown in Fig. 1. Although I have shown and described anti-friction bearings, it may, in some cases where cheapness is desired, to equip the device with a plain bearing. It will be obvious that either type can be used without departing from the scope of my invention.

A rod 12 is rotatably mounted in the bearings 11. This rod has wheels 13 and 14 secured at its ends. Obviously the wheels may be of any type desired. I have found it desirable in practice to construct them of the disc type for the sake of lightness. The wheels are preferably equipped with rubber tires 15 and 16. Upon the rod 12, adjacent the forward end 9 of the clamp 5, I mount a beveled gear 17. This gear is pinned or otherwise secured to the rod 12 so as to rotate therewith. The teeth 18 of this gear are in mesh with the teeth of a bevel pinion 20. The shaft 21 of the gear 20 has secured to it a pair of sickle shaped blades 22 and 23, which are rotated in a horizontal plane. The member 9 is constructed differently from 8 or 11 inasmuch as it has to provide a bearing for the vertical shaft 21 which carries the pinion 20; moreover in some cases the bar 3 is not always located at the same height and as a consequence such variation would tip the blades 22 and 23 out of the horizontal. I overcome this by forming the clamp 5, with a downwardly depending portion 40 which is provided with a slot 41 through which passes a bolt 42 mounted in an aperture 43 formed in a lug 44 which is cast or formed on the member 9. The operation of the attachment is as follows:

The clamps are secured to the cross bar 3 of the lawn mower by means of the bolts 7. On pushing the lawn mower the wheels 15 and 16 will be rolled along the ground and this will bring about the rotation of the rod 12 which carries with it the beveled gear 17, the teeth of which rotate the beveled pinion 20 and this revolves the sickle shaped blades in a horizontal plane and these blades will cut all of the high grass or tough or withered stems which they contact, leaving the rotary blades of the lawn mower to complete the job and furnish the requisite smoothness.

It may, in some instances, be desirable to drive the attachment by means of friction transmitted from the periphery of the wheels 1 and 2 to the rubber tires 15 and 16 on the wheels 13 and 14. When this is to be done, the clamps 4, 5 and 6 are provided with sections 24 and 25, shown in Fig. 6, which are provided with slots and are bolted together by means of bolts 26 and secured to each other through the medium of the nut 27 mounted on the bolt 26. The slots 28 are provided in the sections 24 and 25 so that the spacing between the wheels 1 and 2 of the lawn mower and the wheels 13 and 14 of the attachment, can be shortened until a frictional contact is had. In Figs. 4 and 5 I show my improvement which permits of the utilization of the attachment without the necessity of employing the lawn mower. In this case I provide a handle 30 which carries a shaft 31 at the lower end of which is mounted a fork 32, the ends 33 and 34 of which are connected by means of a bar 35 which corresponds to the spacing bar 3 on the lawn mower. A caster 36 is suitably secured at the lower end of the shaft 31 and at the center of the fork 32. This caster is mounted so as to have universal movement. It will be obvious that when this attachment is secured to the attachment for the lawn mower as clearly seen in Fig. 4 that it can be used as a separate and distinct device. If the user desires to use his lawn mower without the attachment, he can swing it bodily on the rod 12 until it is above the mower and it will rest in that position without interfering with the operation of the mower. Then if he runs into high grass he can swing it back into operative position. It will be apparent that this may be done without the use of any tools as the clamps on the rod must be loose enough to permit the attachment to accommodate itself to any unequalities of the ground.

It will also be obvious to persons skilled in the art that a number of gears and pinions may be used if it is desired to increase the number of sickle shaped blades on the attachment, for example, as shown in Fig. 8.

Having described my invention what I regard as new and desire to secure by Letters Patent is:

1. An attachment for standard lawn mowers, comprising a plurality of clamping members to be detachably secured to a cross bar in the front of said mower, anti-friction bearings in the forward end of each of said members, a rod rotatably mounted in said bearings, a wheel secured to each end of said rod, a bevel gear fixedly secured to said rod adjacent the center of said cross bar, a vertical shaft which extends downwardly from said rod journalled in the clamp adjacent the bevel gear, a bevel pinion thereon in mesh with said bevel gear, a pair of sickle shaped blades secured to said vertical shaft adjacent the ground surface and rotatable therewith.

2. An attachment for standard lawn mowers, comprising a plurality of clamping members to be detachably secured to a cross bar in the front of said mower, anti-friction bearings in the forward end of each of said members one of said bearings being adjacent the center of said cross bar, a lug on said center having an aperture therein, a bolt in said aperture, a downwardly depending portion on the center member having a slot therein through which said bolt passes, a rod rotatably mounted in said bearings, a beveled gear secured to said rod adjacent the center bearing, a vertical shaft which extends downwardly from said rod journalled in the clamp adjacent the bevel gear, a bevel pinion on said vertical shaft in mesh with said bevel gear, a pair of sickle shaped blades secured to said vertical shaft adjacent the ground surface and rotatable therewith.

3. An attachment for a standard lawn mower provided with a horizontal rod comprising a plurality of clamping members to be detachably secured to said rod one of which is adjacent the center of said rod, bearings in the forward ends of each of said members, a rod rotatably mounted in said bearings, a wheel operatively secured at each end of said rotatable rod, a beveled gear fixedly secured to said rod adjacent the center, a vertical shaft which extends downwardly from said rotatable rod, a beveled pinion thereon in mesh with said beveled gear, a pair of sickle shaped blades secured to said vertical shaft adjacent the ground surface and rotatable therewith, and means on the center clamping member to adjust said blades to maintain them in horizontal positions.

ROBERT JONES.